United States Patent
Bae et al.

(10) Patent No.: US 7,821,961 B2
(45) Date of Patent: Oct. 26, 2010

(54) METHOD FOR GENERATING /CHANGING TRANSPORT CONNECTION IDENTIFIER IN PORTABLE INTERNET NETWORK AND PORTABLE SUBSCRIBER STATION THEREFOR

(75) Inventors: Hyung-Deug Bae, Daejeon (KR); Nam-Hoon Park, Daejeon (KR); Jee-Hwan Ahn, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); Hanaro Telecom, Inc., Seoul (KR)

( * ) Notice: Subject to any disclaimer, the term of this patent is extended or adjusted under 35 U.S.C. 154(b) by 287 days.

(21) Appl. No.: 12/090,647

(22) PCT Filed: Oct. 10, 2006

(86) PCT No.: PCT/KR2006/004075

§ 371 (c)(1),
(2), (4) Date: Apr. 17, 2008

(87) PCT Pub. No.: WO2007/046595

PCT Pub. Date: Apr. 26, 2007

(65) Prior Publication Data

US 2008/0267085 A1 Oct. 30, 2008

(30) Foreign Application Priority Data

Oct. 19, 2005 (KR) .................. 10-2005-0098463

(51) Int. Cl.
*G01R 31/08* (2006.01)
*G06F 11/00* (2006.01)
*H04W 4/00* (2009.01)
*H04W 40/00* (2009.01)
*H04L 12/28* (2006.01)
*H04L 12/42* (2006.01)
*H04J 3/16* (2006.01)
*H04J 3/24* (2006.01)
*H04H 20/71* (2008.01)

(52) U.S. Cl. .................. 370/252; 370/338; 370/395.21; 370/346; 370/349; 370/428; 455/3.05; 455/445

(58) Field of Classification Search ...... 370/310–310.2, 370/328–330, 338–345, 346–349, 428; 455/3.01–3.05, 455/445

See application file for complete search history.

(56) References Cited

U.S. PATENT DOCUMENTS 6,587,457 B1 7/2003 Mikkonen (Continued)

FOREIGN PATENT DOCUMENTS

JP 2002-171284 A 6/2002

(Continued)

*Primary Examiner*—Alpus H Hsu
*Assistant Examiner*—Jeremy Costin
(74) *Attorney, Agent, or Firm*—Jefferson IP Law, LLP

(57) ABSTRACT

A terminal including a packet detecting unit, a user input/output unit, a CID managing unit, and a data storing unit is disclosed. The packet detecting unit determines whether a packet can be classified by a pre-established packet classification rule or a packet cannot be classified by the rules. For packets that cannot be classified, the user input/output unit receives QoS information from a user. The CID managing unit generates a new packet classification rule for the unclassified packet, checks a CID in a data storing unit, the CID having the same QoS class as that of the QoS parameter input through the user input/output unit, and determines whether to generate a new CID or to add the new packet classification rule to the pre-established CID. The data storing unit storing unit Stores the new packet classification rule generated by the CID managing unit and information on the CID.

14 Claims, 5 Drawing Sheets

U.S. PATENT DOCUMENTS

| | | | |
|---|---|---|---|
| 7,310,353 B1 * | 12/2007 | Bourlas et al. | 370/473 |
| 7,324,448 B2 | 1/2008 | Lee et al. | |
| 2003/0103525 A1 * | 6/2003 | Wahl | 370/465 |
| 2003/0214948 A1 | 11/2003 | Jin et al. | |
| 2004/0048615 A1 * | 3/2004 | Kato et al. | 455/435.1 |
| 2004/0066783 A1 * | 4/2004 | Ayyagari | 370/395.3 |
| 2004/0109455 A1 * | 6/2004 | Jouppi et al. | 370/395.52 |
| 2004/0160945 A1 * | 8/2004 | Dong et al. | 370/352 |
| 2004/0213224 A1 * | 10/2004 | Goudreau | 370/389 |
| 2006/0039313 A1 * | 2/2006 | Chou et al. | 370/328 |

FOREIGN PATENT DOCUMENTS

| | | |
|---|---|---|
| KR | 10-2003-0042704 A | 6/2003 |
| KR | 10-2003-0043649 A | 6/2003 |
| KR | 10-2003-0059075 A | 7/2003 |
| KR | 10-2005-0110177 A | 11/2005 |
| WO | 02/07388 A2 | 1/2002 |
| WO | 02/47362 A2 | 6/2002 |

* cited by examiner

[Fig. 1]
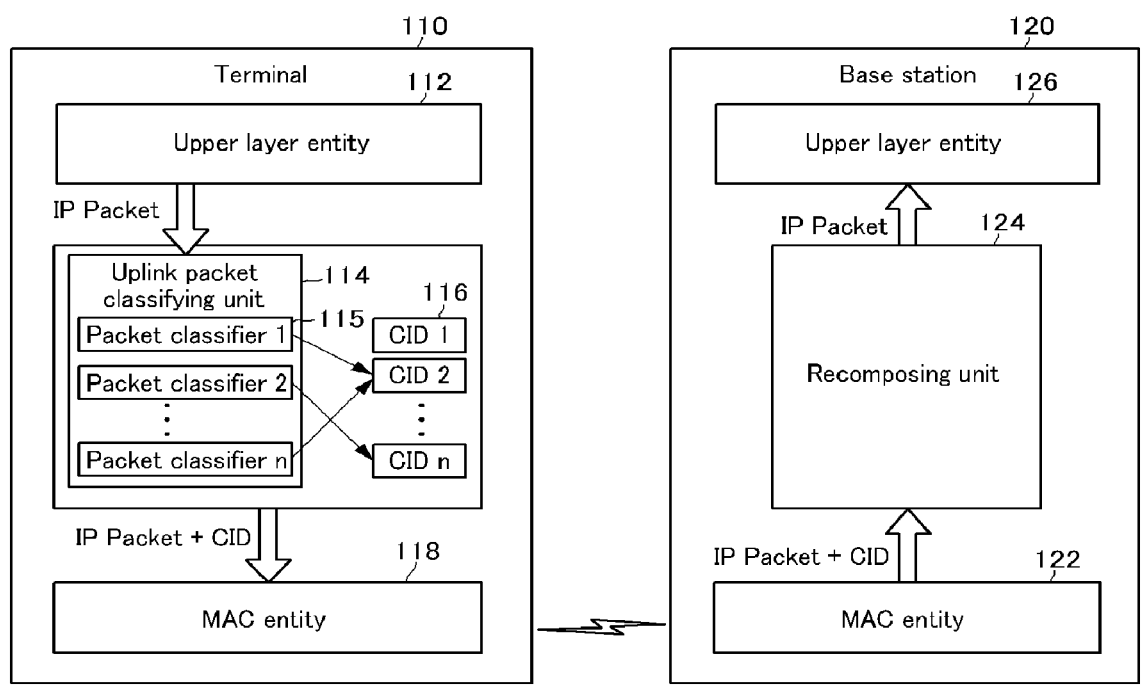

[Fig. 2]
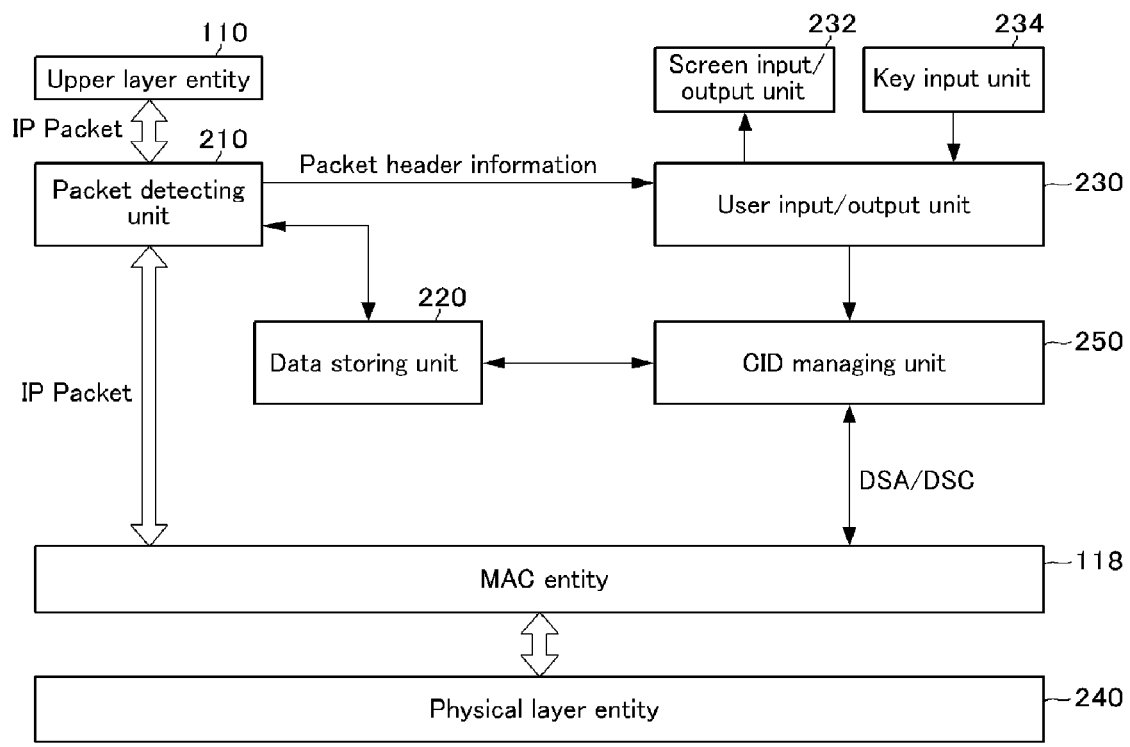

[Fig. 3]
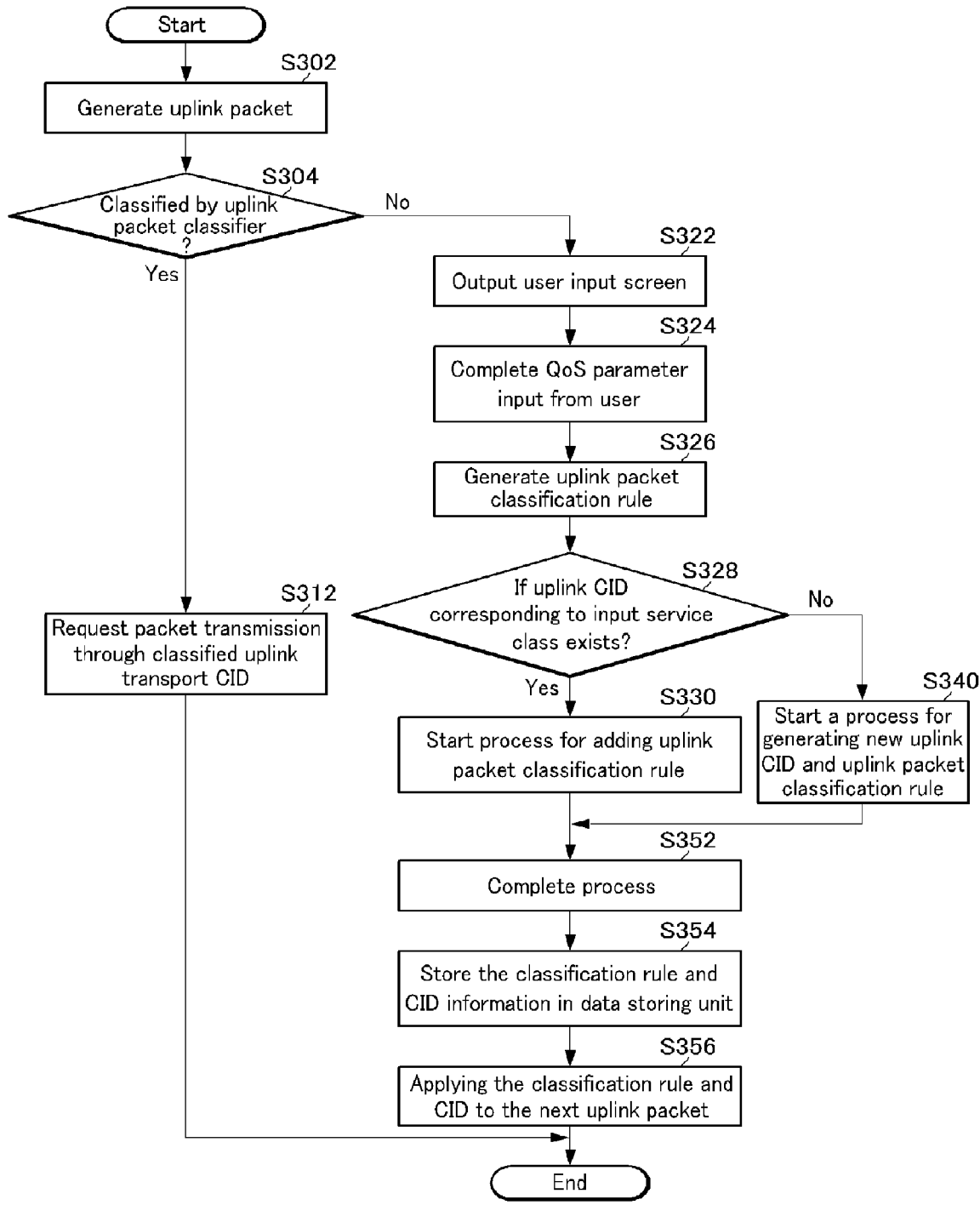

[Fig. 4]
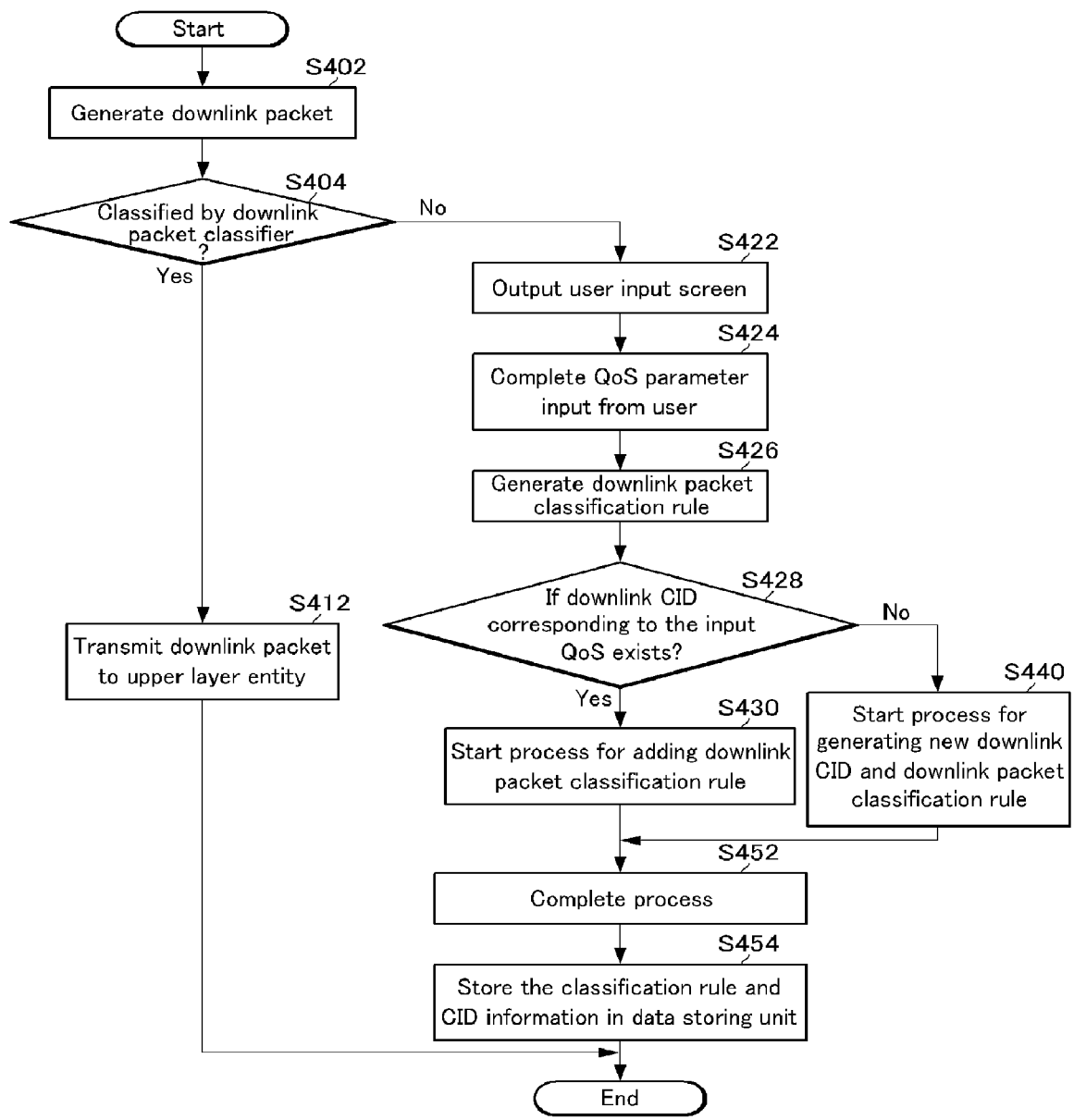

[Fig. 5]

|  | Service class input screen | |
|---|---|---|
| 510— ◇ Program name | C:/Program Files/Microsoft Office/OUTLOOK.EXE | |
| 520— ◇ Server IP address | 129.254.299.144 | |
| 530— ◇ Server port number | TCP/110 | |
| 540— ◇ Service class | | |

| UGS | rtPS | nrtPS | BE |
|---|---|---|---|

○ Data rate      300      (Kbps)
○ Jitter         0.03     (sec)
○ Delay          0.02     (sec)
.....................
○ Error rate     10       (bytes per second)

[ OK ]  [ Cancel ]

METHOD FOR GENERATING /CHANGING TRANSPORT CONNECTION IDENTIFIER IN PORTABLE INTERNET NETWORK AND PORTABLE SUBSCRIBER STATION THEREFOR

TECHNICAL FIELD

The present invention relates to a method for generating/changing a transport connection identifier in a portable Internet system and a terminal using the same. More particularly, the present invention relates to a method for generating and changing a transport connection identifier (CID) and the corresponding quality of service (QoS) parameter and packet classifier for supporting service differentiation in a portable Internet system, and a terminal using the same.

BACKGROUND ART

In a portable Internet system, traffic for data transmission includes four QoS classes. The four QoS classes are respectively classified into an unsolicited grant service (UGS), a real-time polling service (rtPS), a non real-time polling service (nrtPS), and a best effort (BE) service. The UGS supports real-time transmission of fixed-size packets such as a voice over Internet Protocol (VoIP) on a periodic basis, and the rtPS supports real-time transmission of variable size packets such as an MPEG video.

In addition, the nrtPS supports transmission of variable size data bursts (e.g., a file transfer protocol, FTP), and the BE service supports transmission of traffic having lower priority such as e-mail and web-browsing. The above-noted QoS classes are combined with quality of service (QoS) parameters such as traffic rate, jitter, maximum latency, and error rate, and establish a specific connection. A plurality of connections may be established between a terminal and a base station depending on QoS, and each connection can be identified by a connection identifier (CID).

A transport connection between the terminal and the base station in the portable Internet system specifies connection-oriented access methods. Such a transport connection is identified by a CID and the CID is mapped to a service flow identifier (SFID) such that a QoS class for the corresponding connection can be identified. That is, all the CIDs contain at least one piece of QoS parameter information. In addition, mapping of an IP packet to a transport CID is designed to be performed through a packet classifier in the portable Internet system.

The packet classifier defines a plurality of classification rules for classifying an IP packet with a specific transport CID, and the rules are composed by a combination of IP header information, which includes a type of service (TOS), a destination address, a destination port number, a source address, a source port number, and a protocol type.

A packet classifier is connected with only one CID. Thus, in the portable Internet system, an IP packet is classified with a specific CID by the packet classifier and then transmitted. Therefore, an application having a real-time service characteristic must be mapped to a CID having the same QoS class (i.e., real-time service) and a packet classification rule of a packet classifier must be accurately established such that the application can be served with real-time services. A classification rule of a packet classifier that classifies downlink packets transmitted from a base station to a mobile station is applied by the base station, and a classification rule of a packet classifier that classifies uplink packets transmitted from the mobile station to the base station is also applied by the mobile station.

According to the portable Internet standard, a process for generating/changing/deleting a packet classification rule and a CID is the same as that of a service flow of a MAC layer. The service flow is generated, changed, and deleted through standardized processes such as a dynamic service add (DSA) process, a dynamic service change (DSC) process, and a dynamic service delete (DSD) process.

Through the DSA process, informative elements, such as QoS parameter for packet scheduling, a packet classification rule for classifying packets, and a CID allocated by the base station, are transmitted between the mobile station and the base station. The mobile station and the base station generate a packet classifier and a CID by exchanging the QoS parameter and the packet classification rule. In addition, a plurality of packet classifiers, each having the same QoS parameter, can be generated for one CID. For example, two packet classifiers for an e-mail or web-browsing packet can be mapped to one CID.

Herein, the e-mail packet and the web-browsing packet are classified in the same QoS class. In addition, a new packet classifier is added to a pre-established CID through the DSC process.

The DSC process transmits a pre-established CID and new packet classification rule information between the terminal and the base station. As a result, the base station and the terminal share the same packet classifier and CID information. A downlink packet classifier and a downlink transport CID are used for classifying and transmitting an IP packet from the base station to the terminal, and an uplink packet classifier and an uplink transport CID are used for classifying and transmitting an IP packet from the terminal to the base station.

However, it is difficult to identify a QoS class of the IP packet by using only the IP header information. Estimating QoS characteristics from the IP header information is related to how to define a packet classification rule of a packet classifier. The Internet Assigned Number Authority (LANA), an international Internet standardization organization, assigns a well-known port number for an application such that a client program accesses a server by using the well-known port number.

For example, a file transfer protocol (FTP) uses port 21, specifying transmission control protocol (TCP) or user control point (UCP) as a transport protocol, and a packet having the same protocol type and port number as above may have the same QoS as that of the FTP. However, it could be inaccurate to classify packets by using the protocol type and port number when substantial traffic data is transmitted/received because the protocol type and port number are used when the client initially accesses the server and they may be dynamically changed after the initial access.

On the other hand, forming an IP address of an Internet server as a classification rule can be a candidate solution. However, this method also has problems of difficulty and inefficiency of managing packet classification rules for all existing Internet servers. According to another method, an application program may insert QoS class information into a specific field of an IP header for classification of the IP packet. However, this method also has problems of developing an application dedicated to a portable Internet service and accordingly the application becomes incompatible with other typical applications.

To solve the above problems, Korean Patent Publication No. 2003-0043649 (entitled, "Method and apparatus for classifying service classes of packet data in two-way communication network") provides a method for classifying a service class of packet data by measuring a total number of packet data for a predetermined time, determining a parameter based on whether the measured number of packet data is larger than a threshold value associated with a two-way communication characteristics of the packet data transmission, and calculating a value used to classified the service class of the packet data by using the parameter.

In addition, Korean Patent Publication No. 2003-0059075 (entitled "Frame classification for QoS-driven wireless LANs" filed in Jul. 7, 2003) provides a method for classifying a frame by using a frame classification entity (FCE) in a wireless local area network (WLAN). Further, U.S. Pat. No. 587,457 (entitled "Method for Connecting Data Flows" filed in Jan. 1, 2003) provides a method for supporting QoS between a terminal and a base station by mapping a QoS of an IP layer on a radio resource. However, the three prior arts cannot solve the above-state problems such as identifying a service class of a packet, identifying an exact point at which substantial data transmission starts, generation of a transport CID and activation time thereof, identifying QoS parameters of an IP packet, and comparability with a different application and cost reduction. Accordingly, a method for classifying an IP packet by using a transport CID is needed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for generating/changing a transport CID in a portable Internet system and a terminal using the same. Thus, when an application is executed and an unclassified IP packet is generated, the terminal displays details of the unclassified IP packet and receives QoS parameter information from a user such that the terminal generates or changes a transport CID based on QoS information and IP packet header information.

Technical Solution

An exemplary terminal according to one embodiment of the present invention generates and changes a transport connection identifier (CID) for supporting service differentiation in a portable Internet system and includes a packet detecting unit, a user input/output unit, a connection identifier (CID) managing unit, and a data storing unit. The packet detecting unit determines whether a packet can be classified by a pre-established packet classification rule or a packet cannot be classified by the pre-established packet classification rule. For the packet that cannot be classified by the preestablished packet classification rule, the user input/output unit receives QoS information from a user. The CID managing unit generates a new packet classification rule for the unclassified packet, checks a CID in a data storing unit having the same QoS class as that of the QoS parameter input through the user input/output unit, and determines whether to generate a new CID and new packet classification rule or to add the new packet classification rule to the pre-established CID with the same QoS class of the unclassified packet depending on the checking result. The data storing unit stores the new packet classification rule generated by the CID managing unit and information on the CID.

An exemplary method according to another embodiment of the present invention generates and changes a transport connection identifier (CID) of an uplink packet transmitted to a base station from a terminal in a portable Internet system. The method includes: (a) classifying the uplink packet by using an uplink packet classification rule; (b) receiving QoS parameter information for the uplink packet from a user when the uplink packet cannot be classified; (c) generating a new uplink packet classification rule from IP header information of the unclassified uplink packet; (d) checking whether an uplink transport CID that has the same QoS class as that of the QoS parameter information input by the user does exist or not; and (e) performing a dynamic service add (DSA) process between the terminal and the base station for generating a new uplink CID when any uplink transport CID with the same QoS class does not exist or performing a dynamic service change (DSC) between the terminal and the base station for adding the new packet classification rule to the uplink transport CID when an uplink transport CID with the same QoS class does exist, depending on a result of the checking in (d).

An exemplary method according to another embodiment of the present invention generates and changes a transport connection identifier (CID) of a downlink packet transmitted to a terminal from a base station in a portable Internet system. The method includes: (a) classifying a received downlink packet by using a downlink packet classification rule; (b) receiving quality of service (QoS) parameter information from a user when the downlink packet cannot be classified; (c) generating a new downlink packet classification rule from header information of the unclassified downlink IP packet; (d) checking whether a downlink transport CID that has the same QoS class as that of the QoS parameter information input by the user does exist or not; and (e) performing a dynamic service add (DSA) process between the terminal and the base station for generating a new downlink CID when any downlink transport CID with the same QoS class does not exist or performing a dynamic service change (DSC) process between the terminal and the base station for adding the new downlink packet classification rule to the downlink transport CID when a downlink transport CID with the same QoS class does exist, depending on a result of the checking in (d).

ADVANTAGEOUS EFFECTS

According to the above-described embodiments of the present invention, a method for obtaining QoS parameters of an IP packet in a portable Internet system is provided and technical difficulties associated with generation and change of an efficient transport CID are solved such that accurate packet classification and packet service differentiation between a terminal and a base station can be achieved.

BRIEF DESCRIPTION OF THE DRAWINGS

FIG. 1 exemplarily shows a mapping process of a packet classifier and a transport connection identifier for packets transmitted from a terminal to a base station.

FIG. 2 is a block configuration showing an internal configuration of a terminal for uplink and downlink packet classification and transport connection identifier generation/modification according to an exemplary embodiment of the present invention.

FIG. 3 is a flowchart showing a process for generating and changing an uplink packet classifier and a transport connection identifier according to an exemplary embodiment of the present invention.

FIG. 4 is a flowchart showing a process for generating and changing a downlink packet classifier and a transport connection identifier according to the exemplary embodiment of the present invention.

FIG. 5 exemplarily shows a screen display provided by a terminal for inputting a service class therethrough according to an exemplary embodiment of the present invention.

BEST MODE FOR CARRYING OUT THE INVENTION

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

FIG. 1 exemplarily shows a mapping process of a packet classifier and a transport connection identifier for a packet transmitted from a terminal to a base station in a portable Internet system.

In the portable Internet system, a terminal 110 includes an upper layer entity 112, an uplink packet classifier 114, and a medium access control (MAC) entity 118, and a base station 120 includes a MAC entity 122, a recomposing unit 124, and an upper layer entity 126. In the following description, the upper layer entities 112 and 126 and the MAC entities 118 and 122 of the terminal 110 and the base station 120 are respectively referred to as a terminal upper layer entity 112, a terminal MAC entity 118, a base station upper layer entity 126, and a base station MAC entity 122 to make a distinction therebetween.

The terminal upper layer entity 112 performs a distribution process and information exchange in four upper layers (network layer, session layer, presentation layer, and application layer) of the open system interconnection (OSI) seven layers, and processes Internet Protocol (IP) packets generated from an application of the terminal 110. The terminal upper layer entity 112 corresponds to the base station upper layer entity 126 of the base station 120 that communicates with the terminal 110, and accordingly, the base station upper layer entity 126 receives, analyzes, and processes distribution processing data and information exchange data generated from the terminal upper layer entity 112 and the IP packets generated from the application of the terminal 110.

The uplink packet classification unit 114 classifies packet data transmitted from the terminal upper layer entity 112 into an uplink transport connection identifier (CID) 116 according to classification rules of a plurality of uplink packet classifiers 115, and controls the terminal MAC entity 118 to transmit the packet data through the uplink transport CID 116. The rules of the uplink packet classifier 115 are formed by a combination of IP header information that includes a type of service (TOS), a destination address, a source address, a destination port number, a source port number, and a protocol type.

The terminal MAC entity 118 transmits the received IP packets to the base station MAC entity 122 of the base station 120 through an uplink CID assigned by the uplink packet classifier 115.

The base station MAC entity 122 receives the IP packet from the terminal MAC entity 118 and delivers the same to the recomposing unit 124, and the recomposing unit 124 recomposes the IP packet and transmits the recomposed IP packet to the base station upper layer entity 126. The base station upper layer entity 126 analyzes and executes the IP packet.

Similar to the uplink IP packet transmission from the terminal 110 to the base station 120 described in the above-stated embodiment, a downlink IP packet transmitted from the base station 120 to the terminal 110 is classified to a downlink transport CID by using a downlink packet classifier at the base station 120 and transmits the IP packet to the terminal 110 through the downlink transport CID, and the terminal 110 recomposes the IP packet and transmits the recomposed IP packet to the terminal upper layer entity 112. Therefore, an uplink packet classifier and an uplink transport CID must be provided in the terminal 110 for transmitting an uplink IP packet to the base station 120, and a downlink packet classifier and a downlink transport CID must be provided in the base station 120 for transmitting a downlink IP packet to the terminal 110.

FIG. 2 shows a structure of the terminal 110 that processes the uplink and downlink data in more detail.

FIG. 2 is a block diagram showing an internal configuration of a terminal for generation and modification of uplink/downlink packet classifiers and uplink/downlink transport CIDs.

The terminal 110 according to the exemplary embodiment of the present invention further includes a packet detecting unit 210, a CID managing unit 250, a data storing unit 220, a user input/output unit 230, a screen output unit 232, a key input unit 234, and a physical layer entity 240, in addition to the terminal upper layer entity 112 and the terminal MAC entity 118.

The packet detecting unit 210 manages an IP packet transmitted from the terminal upper layer entity 112 for transmission of the packet to the base station 120 from the terminal 110 and an IP packet received from the base station 120 through the terminal MAC entity 118. Hereinafter, the IP packet transmitted from the terminal 110 to the base station 120 will be referred to as an uplink packet, and the IP packet transmitted from the base station 120 to the terminal 110 will be referred to as a downlink packet. That is, the packet detecting unit 210 maps the uplink packet to the uplink transport CID according to the pre-established classification rules and transmits the uplink packet to the terminal MAC entity 118 for forwarding the same to the base station 120, and transmits the downlink packet received through the terminal MAC entity 118 to the terminal upper layer entity 112 for execution of the downlink packet. In addition, the packet detecting unit 210 checks whether the uplink packet or the downlink packet can be classified by using the pre-established classification rules. When the packet cannot be classified by using the pre-established classification rules, that is, when the packet classifier cannot classify the packet, the packet detecting unit 210 transmits header information of the corresponding IP packet to the user input/output unit 230 for receiving QoS parameter information from a user.

When receiving the header information of the IP packet that cannot be classified in the packet detecting unit 210, the user input/output unit 230 is connected with the screen output unit 232 for outputting a service class input screen therethrough so as to request QoS parameter information of the corresponding application from a user and the key input unit 234 for receiving the QoS parameter information from the user therethrough. That is, the screen output unit 232 and the key input unit 234 are used for receiving QoS parameter information of the corresponding application from the user. In addition, the user input/output unit 230 transmits the QoS parameter information input through the key input unit 234 to the CID managing unit 250.

The CID managing unit 250 generates a packet classification rule by using header information of the IP packet. The header information includes an IP address or port number of the terminal, or an IP address or port number of a server. When there is no CID having the same service class as that of the QoS parameter information input through the user input/output unit 230, the CID managing unit 250 requests the terminal MAC entity 118 to start a DSA process for generating a new CID by combining a new packet classification rule and the input QoS parameter information. When there is a CID having the same service class as that of the input QoS parameter information, the CID managing unit 250 requests the terminal MAC entity 118 to start the DSA process for adding the new packet classification rule to the CID with the same QoS class.

The data storing unit 220 is a memory storing device storing the new packet classification rule and the new CID information generated from the CID managing unit 250, and provides information on the new packet classification rule and the new CID to the packet detecting unit 210.

The physical layer entity 240, which is a lower layer of the terminal MAC entity 118, receives an IP packet to be transmitted from the terminal MAC entity 118 to the base station 120 and transmits the IP packet to a physical layer of the base station 120.

FIG. 3 is a flowchart showing a process for generating/changing an uplink packet classifier and a transport connection identifier according to an exemplary embodiment of the present invention.

When an uplink packet to be transmitted from the terminal 110 to the base station 120 is generated in step S302, the packet detecting unit 210 classifies the uplink packet by using the classification rule of the uplink packet classifier in step S304. Herein, the classification rule is stored in the data storing unit 220.

When the uplink packet is classified in accordance with the uplink packet classification rule, the terminal MAC entity 118 is requested to transmit the uplink packet through a classified transport CID. The terminal MAC entity 118 that has received the uplink packet transmission request transmits the uplink packet to the base station 120 through the transport CID in step S312.

However, in step S304, when the uplink packet cannot be classified by using the uplink packet classification rule, header information of the uplink packet is transmitted to the user input/output unit 230 and the user input/output unit 230 outputs a service class input screen through the screen output unit 232 for requesting QoS parameter information in step S322.

The user checks the service class input screen displayed on the screen output unit 232, and inputs the corresponding QoS parameter information through the key input unit 234. When the user input is completed, the user input/output unit 230 checks the input QoS parameter information and transmits the same to the CID managing unit 250 in step S324, and the CID managing unit 250 generates a new uplink packet classification rule by using the header information (e.g., an IP address and a port number of the terminal, or an IP address or a port number of the server) of the uplink packet in step S326. In addition, the CID managing unit 250 checks whether an uplink transport CID for a service class that corresponds to the QoS parameter information input by the user exists, in step S328.

When the uplink transport CID for the service class that corresponds to the QoS parameter information input by the user exists, a DSC process is performed for adding the uplink packet classification rule generated in the step S325 to the checked uplink transport CID in step S330.

However, when an uplink transport CID having a service class that corresponds to the QoS parameter information input by the user does not exist in step S328, a DSA process is performed to generate a new uplink CID and a new uplink packet classification rule by combining the uplink packet classification rule generated in step S326 and the QoS parameter information input by the user, in step S340.

When application of the uplink packet classification rule generated through the DSC and DSA processes in steps S330 and S340 is completed in step S352, the uplink packet classification rule and the CID-related information are stored in the data storing unit 220 in step S354 such that the next uplink packet can be classified in accordance with this uplink packet classification rule in step S356.

FIG. 4 is a flowchart showing a process for generating/changing a downlink packet classifier and a transport connection identifier according to an exemplary embodiment of the present invention.

When the terminal 110 receives a downlink packet from the base station 120 in step S402, the packet detecting unit 210 classifies the packet by using a downlink packet classification rule of a downlink packet classifier in step S404. The downlink packet classification rule is stored in the data storing unit 220.

When the downlink packet is classified in accordance with the downlink packet classification rule, the downlink packet is transmitted to the terminal upper layer entity 112 and the downlink packet classification is terminated in step S412.

However, when the downlink packet cannot be classified in accordance with the downlink packet classification rule in step S404, header information of the downlink packet is transmitted to the user input/output unit 230 and the user input/output unit 230 outputs the service class input screen through the screen output unit 232 in step S422.

When receiving QoS parameter information from a user through the key input unit 234, the user input/output unit 230 transmits the input QoS parameter information to the CID managing unit 250 in step S424 and the CID managing unit 250 generates a new downlink packet classification rule of the downlink packet classifier by using the header information (e.g., an IP address or port number of the terminal, or an IP address or port number of the server) in step S426. In addition, the CID managing unit 250 checks whether a downlink transport CID having the same QoS class as that of the QoS parameter information input by the user exists, in step S428.

When the downlink transport CID having the same QoS class as that of the QoS parameter information input by the user exists, a DSC process is performed for adding the downlink packet classification rule generated in step S426 to the CID, in step S430.

However, when the downlink transport CID having the same QoS class as that of the QoS parameter information input by the user does not exist in step S428, the DSA process is performed for generating a new downlink transport CID and a new downlink packet classification rule by combining the new downlink packet classification rule generated in step S426 and the QoS parameter information input by the user in step S440.

When application of the packet classification rule application through the DSC and DSA processes is completed in step S452, the new downlink packet classification rule and downlink transport CID information are stored in the data storing unit 220 in step S454.

The classified downlink packet is executed through the terminal upper layer entity 112.

Accordingly, an uplink packet classifier, a downlink packet classifier, and a CID can be generated and changed through the methods that have been described with reference to FIG. 3 and FIG. 4.

FIG. 5 is an exemplary screen that the terminal provides for inputting of a service class therethrough according to an exemplary embodiment of the present invention.

When the terminal 110 transmits an uplink packet to the base station 120 or receives a downlink packet from the base station 120, the packet detecting unit 210 classifies the packet by using the uplink packet classification rule or the downlink packet classification rule stored in the data storing unit 220. In the case that the downlink packet or the uplink packet cannot be classified by using the uplink packet classification rule or downlink packet classification rule, the service class input screen is displayed on the screen output unit 232 for receiving QoS parameter information from the user.

The screen displayed on the screen output unit 232 is formed of a program name 510, a server IP address 520, a server port number 530, and a service class 540, as shown in FIG. 5.

The program name 510 displays a name of an application that transmits/or receives an unclassified uplink/downlink packet.

The server IP address 520 and the server port number 530 display information extracted from a header of the unclassified uplink/downlink packet. In this case, the server IP address of the unclassified uplink packet becomes a destination address, and the server IP address of the unclassified downlink packet becomes a source address.

Herein, the program name 510, the server IP address 520, and the server port number 530 are information that is provided by the user input/output unit 230 and cannot be modified by a user.

The service class 540 provides a choice among four QoS types defined by the portable Internet standard so that the user can select one of USG, rtPS, nrtPS, and BE services therethrough. The service class 540 also displays QoS parameters for each QoS type. The QoS parameters include data rate, jitter, and error rate.

When the user selects one service class (i.e., QoS type), predetermined default QoS values are automatically set. In addition, the user may manually modify the default QoS parameter values.

The above-described exemplary embodiment of the present invention may be realized by an apparatus and a method, but it may also be realized by a program that realizes functions corresponding to configurations of the exemplary embodiment or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A terminal that generates and changes a transport connection identifier (CID) for supporting service differentiation in a portable Internet system, the terminal comprising:
    a packet detecting unit for determining a first packet that can be classified by a pre-established packet classification rule and a second packet that cannot be classified by the pre-established packet classification rule;
    a user input/output unit for requesting a user to input a Quality of Service (QoS) parameter for the second packet that cannot be classified, based on header information of the second packet, and for receiving the QoS of the second packet from the user;
    a CID managing unit for generating a new packet classification rule based on the second packet that cannot be classified, checking a CID having the same service class as that of the QoS parameter input through the user input/output unit, and determining whether to generate a new CID or to add the new packet classification rule to the checked CID depending on the checking result; and
    a data storing unit for storing the new packet classification rule generated by the CID managing unit and information on the CID,
    wherein when it is checked that a CID having the same QoS class as that of the QoS parameter input through the user input/output unit does exist, the CID managing unit performs a dynamic service change (DSC) process between the terminal and a base station to add the new packet classification rule to the checked CID, and when it is checked that a CID having the same QoS class as that of the QoS parameter input through the user input/output unit does not exist, the CID managing unit performs a dynamic service add (DSA) process to generate a new CID by combining the new packet classification rule and the QoS parameter input through the user input/output unit.

2. The terminal of claim 1, wherein when it is determined that the second packet cannot be classified by the packet classification rule, the packet detecting unit transmits header information of the second packet to the user input/output unit for receiving the QoS parameter from a user.

3. The terminal of claim 1, wherein the QoS parameter includes at least one of an unsolicited grant service (UGS), a real-time polling service (rtPS), a non real-time polling service (nrtPS), and a best effort (BE) service in the portable Internet system.

4. The terminal of claim 3, wherein the user input/output unit receives a QoS parameter value as an input value, the QoS parameter value including a traffic rate, jitter, maximum latency, and an error rate.

5. The terminal of claim 1, wherein the terminal further comprises:
    a screen output unit for outputting a service class input screen for requesting input of the QoS parameter; and
    a key input unit for receiving QoS parameter information from the user.

6. The terminal of claim 1, wherein the user input/output unit requests the user to input the QoS parameter by displaying at least one of a name of an application that transmits/or receives the second packet, a server IP address and server port number extracted from the header information of the second packet, and service classes corresponding to the predetermined QoS types.

7. A method for generating and changing a transport connection identifier (CID) of an uplink packet transmitted to a base station from a terminal in a portable Internet system, the method comprising:
   determining whether the uplink packet can be classified by using an uplink packet classification rule;
   requesting a user to input a Quality of Service (QoS) parameter for the uplink packet when it is determined that the uplink packet cannot be classified, and receiving QoS parameter information for the uplink packet from the user;
   generating a new uplink packet classification rule from header information of the uplink packet when the uplink packet cannot be classified;
   checking whether an uplink transport CID that has the same QoS class as that of the QoS parameter information input from a user does exist; and
   performing a dynamic service add (DSA) process between the terminal and the base station so as to generate a new uplink CID, or performing a dynamic service change (DSC) between the terminal and the base station so as to add the new packet classification rule to the uplink transport CID depending on a result of the checking of the uplink transport CID,
   wherein the performing of the DSA process comprises:
      when the uplink transport CID that has the same QoS class as the QoS parameter information exists, performing the DSC process between the terminal and the base station so as to add the new uplink packet classification rule to the existing uplink transport CID with the same QoS class, and
      when the uplink transport CID that has the same QoS class as the QoS parameter information does not exist, performing the DSA process between the terminal and the base station so as to generate a new uplink transport CID by combining the new uplink packet classification rule and the QoS parameter information input by the user.

8. The method of claim 7, further comprising:
   storing the new uplink packet classification rule and the new uplink transport CID for the next uplink packet transmission.

9. The method of claim 7, wherein the classifying of the uplink packet using the uplink packet classification rule comprises transmitting the uplink packet to the base station through an uplink transport CID that corresponds to the uplink packet classification rule.

10. The method of claim 7, wherein the requesting of the user to input the QoS comprises displaying at least one of a name of an application that transmits/or receives the second packet, a server IP address and server port number extracted from the header information of the second packet, and service classes corresponding to the predetermined QoS types.

11. A method for generating and changing a transport connection identifier (CID) of a downlink packet transmitted to a terminal from a base station in a portable Internet system, the method comprising:
   determining whether a received downlink packet can be classified by using a downlink packet classification rule;
   requesting a user to input a Quality of Server (QoS) parameter for the received downlink packet when it is determined that the received downlink packet cannot be classified, and receiving the quality of service (QoS) parameter information from the user;
   generating a new downlink packet classification rule from header information of the downlink packet when the downlink packet cannot be classified;
   checking whether a downlink transport CID that has the same QoS class as that of the QoS parameter input by the user does exist; and
   performing a dynamic service add (DSA) process for generating a new downlink CID, or a dynamic service change (DSC) process for adding the new downlink packet classification rule to the existing downlink transport CID depending on a result of the checking of the downlink parameter,
   wherein the performing of the DSA process comprises:
      when a downlink transport CID that has the QoS service class as that of the QoS parameter exists, performing the DSC process between the terminal and the base station so as to add the new downlink packet classification rule to the existing downlink transport CID; and
      when the downlink transport CID that has the same QoS class as that of the QoS parameter does not exist, performing the DSA process between the terminal and the base station so as to generate a new downlink transport CID by combining the new downlink packet classification rule and the QoS parameter input by the user.

12. The method of claim 11, further comprising:
   storing the new downlink packet classification rule and the new downlink CID so as to transmit the next downlink packet with an appropriate QoS class.

13. The method of claim 11, wherein the classifying of the received downlink packet comprises:
   when the downlink packet is classified by using the downlink packet classification rule, transmitting the downlink packet to an upper layer entity of the terminal.

14. The method of claim 11, wherein the requesting of the user to input the QoS comprises displaying at least one of a name of an application that transmits/or receives the second packet, a server IP address and server port number extracted from the header information of the second packet, and service classes corresponding to the predetermined QoS types.

* * * * *